(12) United States Patent
Buonavita

(10) Patent No.: US 6,246,183 B1
(45) Date of Patent: Jun. 12, 2001

(54) DIMMABLE ELECTRODELESS LIGHT SOURCE

(75) Inventor: Carl E. Buonavita, Laguna Beach, CA (US)

(73) Assignee: Litton Systems, Inc., Agoora Hills, CA (US)

( * ) Notice: Subject to any disclaimer, the term of this patent is extended or adjusted under 35 U.S.C. 154(b) by 0 days.

(21) Appl. No.: 09/514,869

(22) Filed: Feb. 28, 2000

(51) Int. Cl.$^7$ ................................................. H05B 41/16
(52) U.S. Cl. ........................... 315/248; 315/291; 315/278; 315/DIG. 4; 315/158
(58) Field of Search ................................. 315/248, 344, 315/209 R, 226, 291, DIG. 4, 158, 149, 276, 278, 282

(56) References Cited

U.S. PATENT DOCUMENTS

| | | | |
|---|---|---|---|
| 4,487,481 | 12/1984 | Suzawa | 350/345 |
| 5,013,975 | * 5/1991 | Ukegawa et al. | 315/248 |
| 5,027,041 | * 6/1991 | Godyak et al. | 315/248 |
| 5,095,249 | * 3/1992 | Roberts et al. | 315/248 |
| 5,140,227 | * 8/1992 | Dakin et al. | 315/248 |
| 5,142,201 | * 8/1992 | Wessels | 315/209 R |
| 5,645,337 | 7/1997 | Gleckman | 362/29 |
| 5,754,159 | 5/1998 | Wood | 345/102 |
| 5,818,554 | 10/1998 | Hiyama et al. | 349/67 |
| 5,907,222 | 5/1999 | Lengyel et al. | 315/158 |
| 5,994,840 | * 11/1999 | Forsdyke et al. | 313/635 |

OTHER PUBLICATIONS

OSRAM Sylvania Icetron Inductively Coupled Elcetrodeless Lighting System, Design Guide, Jul. 1998.

* cited by examiner

*Primary Examiner*—Haissa Philogene
(74) *Attorney, Agent, or Firm*—Fletcher, Yoder & Van Someren (57) ABSTRACT

A dimmable electrodeless light source includes an electrodeless lamp, an electronic ballast and a dimming module. The light source further includes coupling transformers coupled to the electrodeless lamp for inductively coupling power to the lamp to generate light. An auxiliary winding electromagnetically coupled to the primary winding of at least one of the coupling transformers is driven by switching circuitry in the dimming module. The switching circuitry is pulse width modulated to control the average brightness of the light generated by the electrodeless lamp. An exemplary application for the dimmable electrodeless light source is as a backlight for a video display device, such as an liquid crystal display unit.

33 Claims, 4 Drawing Sheets

DIMMABLE ELECTRODELESS LIGHT SOURCE

BACKGROUND OF THE INVENTION

1. Field Of The Invention

The present invention relates generally to electrodeless light sources and, more particularly, to a method and apparatus for dimming an electrodeless fluorescent light source.

2. Background Of The Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional fluorescent lamps are driven with an electronic ballast which powers the lamps via electrodes disposed at each end of the lamp. The electrodes, however, are major life-limiting components of the fluorescent lamp. Electrodeless fluorescent lamps also are known. An electrodeless lamp is configured as a closed loop tube around which one or more coupling transformers are positioned. As with conventional fluorescent tubes, the electrodeless lamp is energized by an electronic ballast. However, rather than applying power to electrodes disposed at each end of a lamp tube, the ballast drives the coupling transformers, which, in turn, inductively couple the power to the lamp. The elimination of electrodes from the fluorescent lamp is particularly advantageous as it increases the life and reliability of the lamp and systems incorporating such lamps. Thus, electrodeless lamps are particularly useful in applications in which access to the lamps is restricted such that replacement of the lamps becomes difficult or expensive.

Backlit video display devices are one type of application in which the access to the lamp is not readily available. Such video displays may be found in computer systems, automatic teller machines, information kiosks, gas pumps, shipboard controls, etc. To enhance viewing of displayed images, such video displays commonly include a backlight source to provide a brightly lit background that contrasts with the displayed image. However, such video displays often are located in environments in which the ambient lighting conditions vary considerably, interfering with vivid viewing of the displayed image. For example, in a dimly lit environment (e.g., a cloudy day, the enclosed interior of a ship, etc.), a brightly lit background provides for the best viewing of a displayed image. However, in a brightly lit environment (e.g., a sunny day, a well-lit office, etc.), a dimly lit background provides for better viewing. Accordingly, it would be desirable to provide the capability to control the brightness of the backlighting to compensate for variations in ambient lighting to enhance the viewing capabilities of the video display unit further. Unfortunately, electrodeless lamps rarely are used in such displays due to the lack of suitable means for dimming such lamps.

The use of electrodeless fluorescent lamps is not limited to backlight sources for video display units or applications in which the lamp is not readily accessible. Electrodeless lamps also may be used in other types of applications requiring a light source, such as office or home lighting systems, desk lamps, etc. Moreover, if the control of the brightness of the light generated by the lamps in these other applications also is desirable, it would be advantageous to provide the capability to vary the brightness of the generated light in any type of lighting application in which an electrodeless fluorescent lamp is incorporated. Still further, it would be advantageous to provide a dimming module for electrodeless lamps that can be easily installed in existing electrodeless lighting systems to retrofit such systems with a brightness control capability The present invention may address one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, a dimmable light source includes an electrodeless lamp to generate light, a ballast coupled to the lamp to energize the lamp, and a dimming circuit coupled to the lamp. The dimming circuit controls the amount of energy provided to the lamp to vary the brightness of the generated light.

In accordance with another aspect of the present invention, there is provided a dimming circuit for an electrodeless lamp that is inductively coupled to a coupling transformer. The coupling transformer provides electromagnetic energy to cause the lamp to generate light. The dimming circuit includes an auxiliary winding electromagnetically coupled to the coupling transformer, a switch coupled to the auxiliary winding, and a drive circuit coupled to the switch. The drive circuit is configured to transition the switch between a conductive state and a non-conductive state during a time interval to control the brightness of the generated light. During the conductive state, a current-carrying path is established through the auxiliary winding and the switch.

In accordance with still another aspect of the present invention, a dimmable display device includes an electrodeless lamp to generate light, a display unit to display an image and to use the light to enhance viewing of the image, and a dimming module coupled to the lamp. The dimming module controls the brightness of the generated light in response to a control signal, such as a signal representative of a detected amount of ambient light or a signal representative of a user-selected dimming setting.

In accordance with yet another aspect of the present invention, there is provided a method for dimming an electrodeless lamp. The method includes inductively coupling energy to an electrodeless lamp to energize the lamp and generate light and restricting the coupling of the energy during a first time interval of a repetitive time period to dim the generated light.

In accordance with a further aspect of the present invention, there is provided a method for making a dimmable electrodeless light source. The method includes providing an electrodeless lamp, attaching a coupling transformer to the lamp, and disposing an auxiliary winding on the coupling transformer. The method further includes coupling the auxiliary winding to a drive circuit that is configured to establish a current-carrying path through the auxiliary winding for a first time interval of a repetitive time period and to interrupt the current-carrying path through the auxiliary winding for a second time interval of the repetitive time period.

BRIEF DESCRIPTION OF THE DRAWINGS

The foregoing and other advantages of the invention will become apparent upon reading the following detailed description and upon reference to the drawings in which like reference numerals denote like elements, and.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
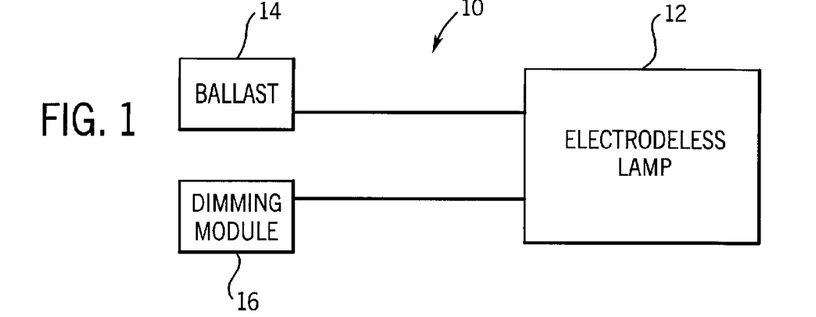
FIG. 1 is a block diagram of a dimmable light source including an electrodeless lamp in accordance with the present invention.

Turning now to FIG. 1, a block diagram of a dimmable light source 10 is illustrated. The dimmable light source 10 includes an electrodeless lamp 12, a ballast 14, and a dimming module 16. The ballast 14 includes circuitry configured to provide energy to the electrodeless lamp 12 to cause the lamp 12 to generate light. The dimming module 16 includes circuitry configured to control the amount of energy provided to the lamp 12 to control the brightness of the generated light.

By way of example, the electrodeless lamp 12 can be an inductively coupled electrodeless fluorescent lamp, such as a lamp included in a lamp assembly available from OSRAM SYLVANIA Products, Inc., located in Danvers, Mass., under one of the product names, ICETRON™ 100 and ICE-TRON™ 150, which are described in the SYLVANIA ICE-TRON Design Guide, Document No. FL022 07/98. Such lamps are configured as closed loop vessels which use electromagnetic-induction technology to energize the lamp and generate light.

Figure 2:
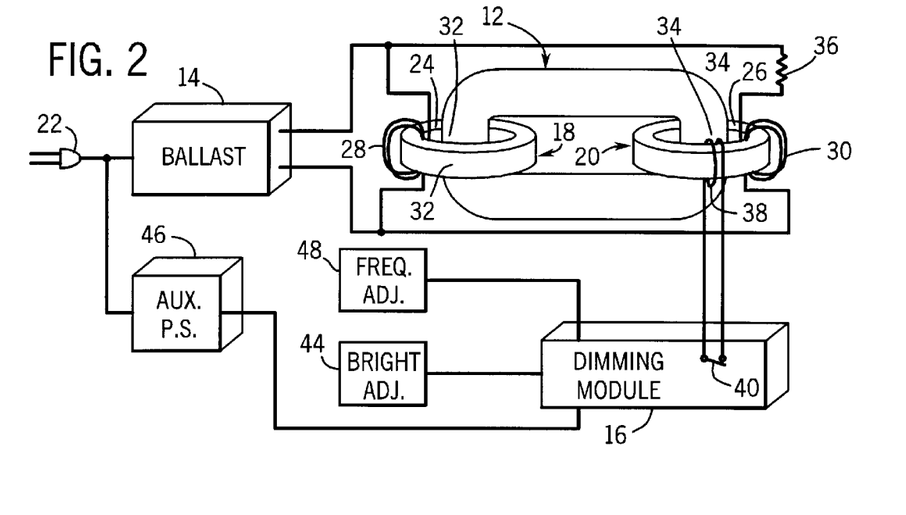
FIG. 2 is a diagrammatic illustration of an embodiment of the dimmable light source of FIG. 1 in which the dimming circuitry includes an auxiliary winding coupled to one of the coupling transformers which energizes the lamp.

Referring to FIG. 2, the lamp 12 is excited by an electromagnetic field produced by a pair of coupling transformers 18 and 20. The coupling transformers 18 and 20 are driven by the electronic ballast 14, such as the QUICK-TRONIC® I.C.E. ballast available from OSRAM SYLVANIA which operates at a frequency of 250 kHz, or any other suitable electronic ballast. The ballast 14 receives input power from a conventional 120 VAC power line via a power plug 22.

The coupling transformers 18 and 20 are substantially identical transformers, each of which include a respective ferrite core 24 and 26, a respective primary winding 28 and 30 and a respective secondary lamp winding 32 and 34. The secondary lamp windings 32 and 34 comprise the sections of the lamp vessel in the regions where the lamp vessel threads through the cores 24 and 26. The SYLVANIA ICETRON lamp assembly, for instance, includes both the lamp and the coupling transforners. The coupling transforners 18 and 20 advantageously have split cores, so that the transformers 18 and 20 may be disposed about the lamp tube and retained by clamps which secure the two halves of each core together, as will be discussed in further detail below. The interconnections of the windings of transformers 18 and 20 are illustrated in FIG. 3.

Figure 3:
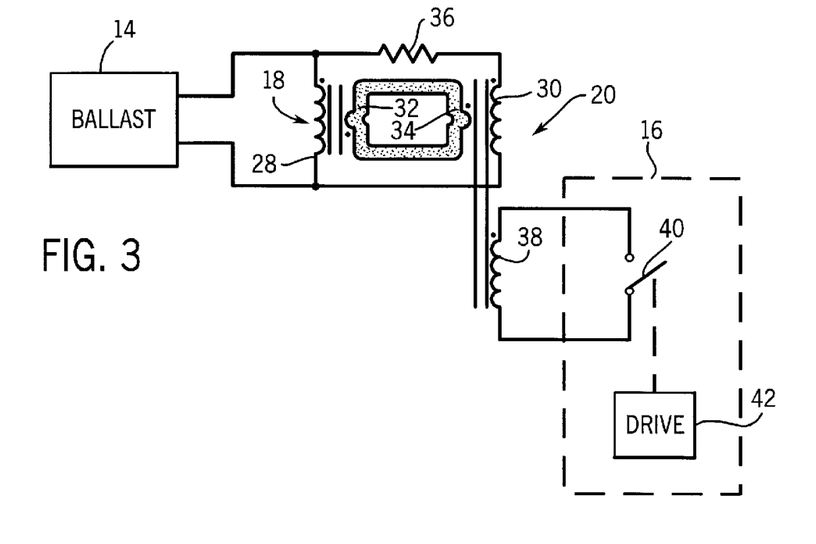
FIG. 3 is an exemplary, simplified schematic diagram of the relationship between the windings of the coupling transformers, the ballast and the dimming circuitry of FIG. 2.

Referring to FIG. 3, the primary winding 28 of the transformer 18 and the primary winding 30 of the transformer 20 are driven by the ballast 14. The primary winding 28 is connected in parallel with the series combination of a resistor 36 and the primary winding 30. The secondary lamp winding 32 of the transformer 18 and the secondary winding 34 of the transformer 20 are connected in series. The primary windings 28 and 30 are driven by the ballast 14 and electromagnetically couple energy from the ballast 14 to the secondary lamp windings 32 and 34, respectively. The secondary windings 32 and 34, which are provided by the lamp vessel, couple the energy to electrodeless lamp 12 to cause the lamp 12 to generate light. In this exemplary embodiment, the primary windings 28 and 30 each are eighteen turns of magnet wire, and each secondary winding is one turn of the lamp vessel. Accordingly, the turns ratio of the overall magnetic circuit is 18:2 (i.e., 9:1) in this exemplary embodiment.

Referring again to FIGS. 2 and 3, the resistor 36 is connected in series with the primary winding 30 of the coupling transforners 20. The resistor 36 is sized to present a minimum load impedance to the ballast 14 and, in one embodiment, has a value of 50 ohms. A minimum load impedance is desirable because conventional ballasts typically include protection circuitry which interrupt operation of the ballast upon detection of load changes. For example, a ballast may include a protection circuit to interrupt operation if a "no load" condition is detected. Further, the ballast electronics may include a protection circuit to interrupt operation if a short circuit condition on the ballast output is detected. Accordingly, the connection of the resistor 36 in series with the output of the ballast 14 ensures that the operation of the ballast electronics shall not be disturbed by the inclusion and/or operation of the dimming circuitry.

Referring to FIGS. 2 and 3, the transformer 20 also includes an auxiliary winding 38. In the disclosed embodiment, the auxiliary winding 38 is made of four turns of magnet wire disposed about the core 26 of the transformer 20. The auxiliary winding 38 is connected to a switch 40 in the dimming module 16. The module 16 further includes a drive device 42 for transitioning switch 40 between alternating conducting and non-conducting states. In the conducting state, a current-carrying path is established through the auxiliary winding 38 and the switch 40. In the non-conducting state, the current-carrying path is interrupted.

The switch 40 can be any type of switching device capable of alternating between conductive and non-conductive states when driven by a drive device. For example, the switch 40 can be a cam-driven switch that is mechanically operated by a multi-lobed cam driven by a rotating shaft. The cam-driven switch can include mechanical provisions for varying the percentage of time that the switch is closed during each rotation cycle (i.e., the duty cycle). Alternatively, the switch 40 can be one or more switching transistors which are driven by appropriate electronic drive circuitry at a selected switching frequency. The electronic drive circuitry can include electrical provisions for varying the percentage of time that the transistor or transistors are closed during each frequency cycle.

Regardless of whether the switch is mechanically driven or electrically driven, when the switch is closed, current flows through the switch and the auxiliary winding to create a short circuit. The short circuit condition is reflected onto the primary winding of the coupling transformer and prohibits, or substantially restricts, the inductive coupling of energy to the lamp. The average brightness of light generated by the lamp during each switching cycle (or shaft rotation) can thus be varied by adjusting the duty cycle of the switch. In the embodiments disclosed, the average brightness increases as the duty cycle of the switch (i.e., the percentage on-time) is decreased. Conversely, the average brightness decreases as the duty cycle of the switch is increased.

In the embodiment disclosed in FIG. 2, the duty cycle of the switch 40 can be adjusted via a brightness adjustment device 44 coupled to the dimming module 16. The device 44 can be a potentiometer having a variable impedance, for instance. The brightness adjustment device 44 advantageously is accessible to a user of the dimmable light source 10 and can include a panel-mounted control device, such as an adjustment knob, dial, or the like. In other embodiments, the brightness adjustment device 44 may operate without user action by including a photodetector which detects ambient lighting conditions and provides an electrical signal representative of the lighting condition for example. The dimming module 16 can be configured to adjust the duty cycle of the switch 40 in response to the electrical signal. The duty cycle may be adjusted, for instance, in discrete steps to provide for discrete brightness levels within a dimming range. Alternatively, the duty cycle may be continuously adjusted to provide for continuous variation of the brightness of the light over the dimming range. The relationship between an exemplary brightness adjustment device 44 and the electronic circuitry of the dimming module 16 will be explained in further detail below with reference to the schematic diagram of FIG. 4.

Referring again to FIG. 2, the dimming module 16, which may be powered by a conventional auxiliary power supply 46 that converts a 120 VAC input to a 12 VDC output, may be connected to a frequency adjustment device 48. Device 48 can include a potentiometer having a panel-mounted, user-accessible control device (e.g., an adjustment knob or dial) that provides for adjustment of the switching frequency of the switch 40. The frequency adjustment feature is particularly advantageous when the lighting source 10 is used as a backlight for a video display because adjustment of the switching frequency of the switch 40 can eliminate visual artifacts that may be visible on the video display due to electromechanical, electrical and/or optical coupling effects caused by the switching of the dimming circuitry. For example, the user of a dimmable light source or of a backlit video display device may perceive a flicker effect in the lighting that is caused by the interruption of generated light by the dimming circuitry. To eliminate the flicker, the switching frequency may be adjusted to a rate that is sufficiently fast such that the flicker cannot be perceived by a user. It has been found that a switching frequency of approximately 120 Hz is particularly suitable to avoid flicker.

Adjustment of the switching frequency of the switch 40 may also be desirable to synchronize the switching frequency with the frequency of the vertical refresh video signal of a video display unit. In some instances, if the switching frequency is not synchronized with the vertical refresh rate, the user may perceive visual artifacts on the display, such as scrolling lines. A panel-mounted control device for varying the switching frequency can allow the user to eliminate the undesirable video effects.

A manually controlled, user-accessible switching frequency adjustment device is optional. For example, the switching frequency adjustment device 48 can be an automatic device or circuit that automatically adjusts the switching frequency in response to a particular parameter. For instance, in an embodiment of the invention in which the dimmable light source 10 is installed as a backlight in a video display device, the frequency adjustment device 48 can be replaced with a frequency synchronization circuit, such as a conventional phase locked loop, that has an input for receiving the vertical refresh video signal of the display unit. In such an embodiment, the frequency synchronization circuit can automatically synchronize the switching frequency to the vertical refresh rate. Regardless whether the switching frequency is automatically or manually adjusted, the adjustment may be performed in discrete steps over a range of frequencies, or the adjustment may be continuous over the range. In other embodiments of the invention, the switching frequency can be set at a fixed frequency (e.g., approximately 120 Hz) which is known to eliminate or minimize the occurrence of most visual artifacts.

Figure 4:
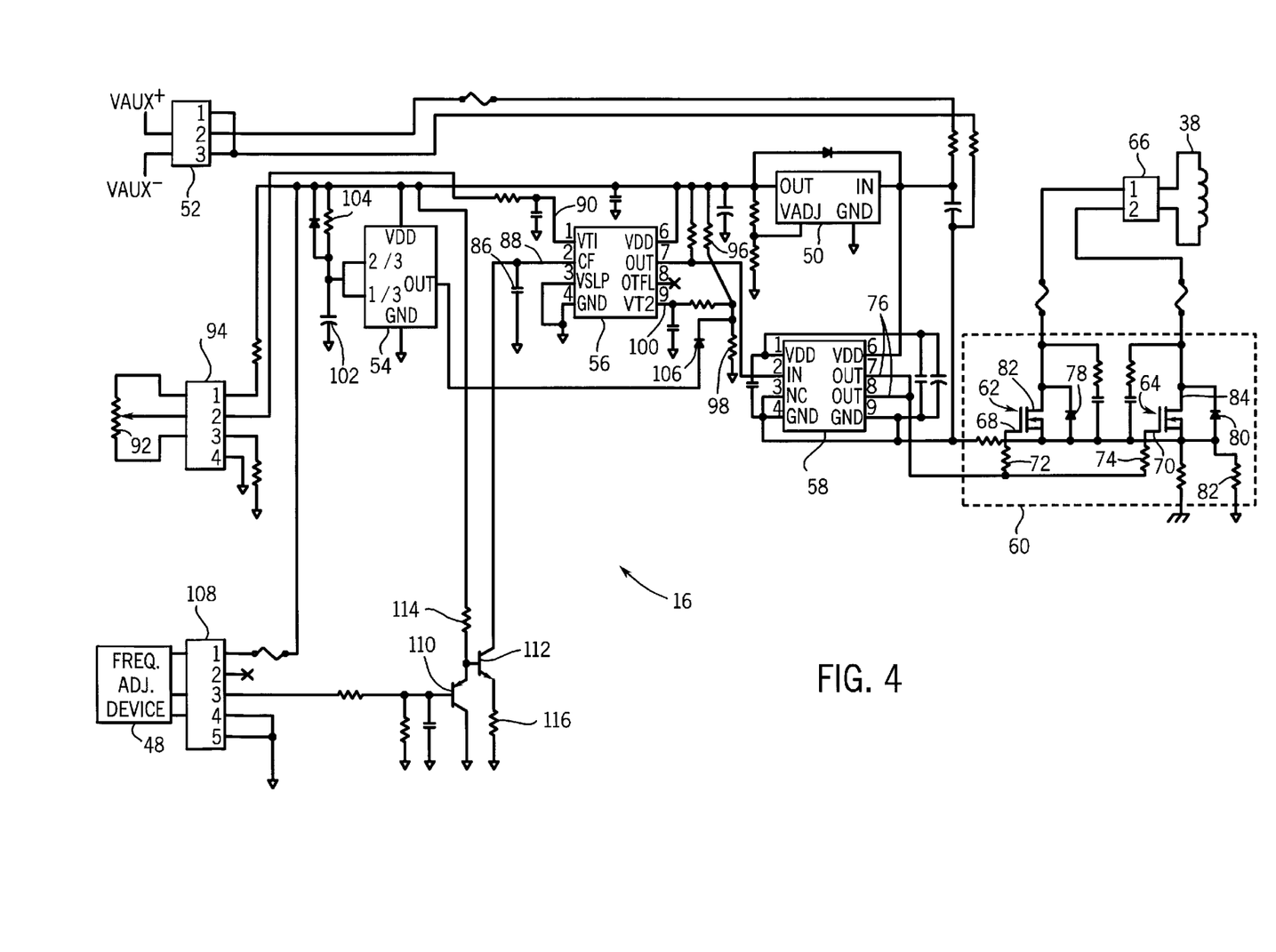
FIG. 4 is an electrical schematic of an exemplary embodiment of the dimming circuitry of the dimmable light source of FIG. 2.

Turning now to FIG. 4, a schematic of an exemplary electronic embodiment of the dimming module 16 is illustrated. It should be noted that the following description focuses on the functions of the primary components of the dimming module and does not discuss in detail the interconnections or the specific function of each individual electrical component illustrated in the schematic, as such details are conventional and would be clearly understood by any person of ordinary skill in the art who reviews this description and the accompanying FIGURES. Further, it should be understood that the specific circuitry illustrated is merely one example of a dimming module for adjusting the brightness of light generated by an electrodeless lamp. It is currently believed that the functions performed by the various electrical devices could be performed by other conventional devices arranged in other configurations, as would be well known by any person of ordinary skill in the art.

The dimming module 16 includes a voltage regulator 50 (e.g., a conventional regulator, such as a MIC5205 available from Micrel) to regulate the 12 VDC input from the auxiliary power supply 46 (input via a connector 52) to a DC level (e.g., 10 VDC) appropriate for use by the other electrical components in the dimming module. The dimming module further includes a timer 54 (e.g., a MIC1555 available from Micrel), a pulse width modulator 56 (e.g., a MIC502 available from Micrel), a driver 58 (e.g., a MAX4429 available from Maxim), and a switch assembly 60 which includes a pair of switching transistors 62 and 64 (e.g., n-channel MOSFETS, such as IXFT26N50 available from IXFT) coupled to the auxiliary winding 38 via a connector 66.

The pulse width modulator 56 provides a pulse width modulated signal to the driver 58, which provides the power to drive the MOSFET switches 62 and 64 between conducting and non-conducting states. The gates 68 and 70 of the MOSFET switches 62 and 64 are connected to resistors 72 and 74, respectively, which prevent undesired oscillation of the switches 62 and 64. The other ends of the resistors 72 and 74 are connected to an output 76 of the driver 58. Diodes 78 and 80 are connected from the source to the drain of switches 62 and 64, respectively. The sources of the FET switches 62 and 64 are connected together and to signal ground through a resistor 82.

The driver 58 provides a pulse width modulated waveform at its output to transition switches 62 and 64 between conductive (i.e., the driver output is at a HIGH level which is at or exceeds the turn-on threshold voltage of the switches 62 and 64) and non-conductive states (i.e., the driver output is at a LOW level which is at or below the threshold voltage to turn off the switches 62 and 64). The MOSFET 62 or 64 which is switched to a conducting state upon application of a HIGH level signal is determined by the polarity of the voltage reflected across the auxiliary winding 38 by the primary winding of the coupling transformer to which the auxiliary winding is coupled. That is, when the polarity of the voltage across the auxiliary winding 38 is such that the voltage at the drain 82 of the MOSFET 62 is positive with respect to the voltage at the drain 84 of the MOSFET 64 and a HIGH level signal is applied to the gates 72 and 74, the MOSFET 62 will transition to a conducting state. In this state, the MOSFET 64 is in a non-conducting state and a current carrying path is established through the auxiliary winding 38, through the MOSFET 62, and through the diode 80 and the internal parasitic diode (not shown) of MOSFET 64. Conversely, when the polarity of the voltage across the auxiliary winding 38 is such that the voltage at the drain 84 of the MOSFET 64 is positive with respect to the voltage at the drain 82 of the MOSFET 62 and a HIGH level signal is applied to the gates 72 and 74, the MOSFET 64 will transition to a conducting state. In this state, the MOSFET 62 is in a non-conducting state and a current carrying path is established through the auxiliary winding, through the MOSFET 64, and through the diode 78 and the internal parasitic diode (not shown) of MOSFET 62.

Thus, whenever either one of the MOSFETS 62 and 64 are in a conducting state, a short circuit is established across the auxiliary winding 38 which is reflected onto the primary winding of the coupling transformer 18 or 20 to which the auxiliary winding is coupled. As a result, the inductive coupling of energy to the electrodeless lamp 12 is interrupted, which substantially interrupts the generation of light. Accordingly, the average light generated by the lamp 12 during one cycle of the switching frequency of the switch assembly 60 can be adjusted by varying the time that the switches 62, 64 are in a conducting state (i.e., the duty cycle) during that cycle.

The switching frequency of the switch assembly 60 is set by a capacitor 86 connected to an input 88 of the pulse width modulator 56 ("PWM"). The capacitor 86 cooperates with internal components of the PWM 56 to create an oscillator which generates a repetitive ramp-shaped voltage signal at the input 88 of the PWM. The repetition rate of the ramp-shaped voltage signal corresponds to the switching frequency of the switch assembly 60. The duty cycle at which the switches 62 and 64 are driven is determined by the PWM's comparison of a variable amplitude voltage signal applied at an input 90 of the PWM 56 with the ramp at the input 88. In one embodiment, the amplitude of the voltage signal is determined by a voltage divider circuit that includes a brightness adjustment device (i.e., a potentiometer 92) which is connected to the dimming module via a connector 94. The value of the potentiometer 92 is selected such that the amplitude of the voltage signal at the input 90 of the PWM can be varied within a range that results in a duty cycle that is fully adjustable between 0% and 100%. The brightness adjustment device advantageously is accessible to a user of the dimmable light source such that the user can select a desired brightness level of the light generated by the electrodeless lamp. For example, the brightness adjustment device can include a control device (e.g., an adjustment knob) mounted on a panel of an enclosure containing the lamp system or mounted in any location accessible by a user of the light source. Alternatively, the brightness adjustment device may be an automatic device that automatically adjusts the brightness in response to a detected parameter, such as detection of ambient lighting conditions.

In certain embodiments, it may be desirable to limit the minimum duty cycle produced at the output of the PWM 56 to ensure a minimum time interval during which the switches 62 and 64 are not in a conducting state. In one embodiment, a voltage divider comprising resistors 96 and 98 is connected to an input 100 of the PWM 56 to ensure that the minimum duty cycle is limited to approximately 1%.

It may also be desirable to disable operation of the dimming module 16 for a brief time period (e.g., a few seconds) after the electrodeless lamp 12 is initially energized. To disable operation temporarily, the dimming module 16 includes the timer 54. Energization of the electrodeless lamp 12 is accompanied by energization of the 12 VDC auxiliary power supply 46 which provides power to the dimming module 16 via the connector 52. When auxiliary power is applied to the dimming module 16, the rate of rise of the voltage signal applied to the input of the timer 54 is controlled by the charging of a capacitor 102 (e.g., 4.4 $\mu$F) through a resistor 104 (e.g., 845 Kohms). During the time the voltage on the capacitor 102 is below a threshold level, the voltage produced at the output of the timer 54 remains at a HIGH level. The output of the timer 54 is coupled to the input 100 of the PWM 56 through a diode 106. While the timer output is HIGH, the diode 106 is forward biased, thus allowing application of the HIGH level voltage to the input 100 of the PWM 56, which prevents switching of the transistors 62 and 64, thus disabling dimming of the light generated by the lamp 12. When the voltage on the capacitor 102 exceeds the threshold level, the voltage at the output of the timer 54 transitions to a LOW level, thus reverse biasing the diode 106 which enables operation of the PWM 56 and, consequently, dimming of the light generated by the lamp.

In the illustrated embodiment, the switching frequency of the switch assembly 60 of the dimming module also can be adjusted via a frequency adjustment device 48 connected to the dimming module 16 via a connector 108. In one embodiment, the frequency adjustment device can be a potentiometer which can be varied to adjust the amount of current drawn by a constant current source (sink) connected to the input 88 of the PWM 56. The constant current source (sink) includes transistor 110 (e.g., a PNP transistor), transistor 112 (e.g., a NPN transistor), and resistors 114 and 116 (e.g., 100K ohms and 43K ohms, respectively). As the frequency adjustment device 48 is adjusted to increase the amount of current pulled by the transistor 112, the repetition rate of the ramp-shaped voltage signal at the input 88 of the PWM 56 decreases (i.e., the switching frequency of the dimming module decreases). Conversely, as the frequency adjustment device 48 is adjusted to decrease the amount of current sourced by transistor 112, the repetition rate of the rampshaped voltage signal increases. As discussed above, the frequency adjustment device 48 advantageously is accessible to a user of the dimmable light source such that the user can adjust the switching frequency to eliminate undesirable visual artifacts perceived in the lighting or on a display.

In an alternative embodiment, the frequency adjustment device 48 can be an electrical circuit configured to receive an electrical synchronization signal and to cooperate with the dimming module electronics to automatically synchronize the switching frequency to the received synchronization signal. For example, the frequency adjustment device 48, together with the constant current source (sink), can be configured as a phase-locked loop. That is, the frequency adjustment device 48 can be configured as a phase comparator that receives as an input the vertical video refresh signal from the video circuitry of a display unit which incorporates a dimmable electrodeless lamp system for backlighting. The frequency adjustment device 48 outputs a square wave voltage signal based on the comparison that causes the constant current source (sink) to synchronize the PWM oscillator. The phase-locked loop thus can synchronize the switching frequency of the switch assembly 60 to the frequency of the vertical refresh signal.

Figure 5:
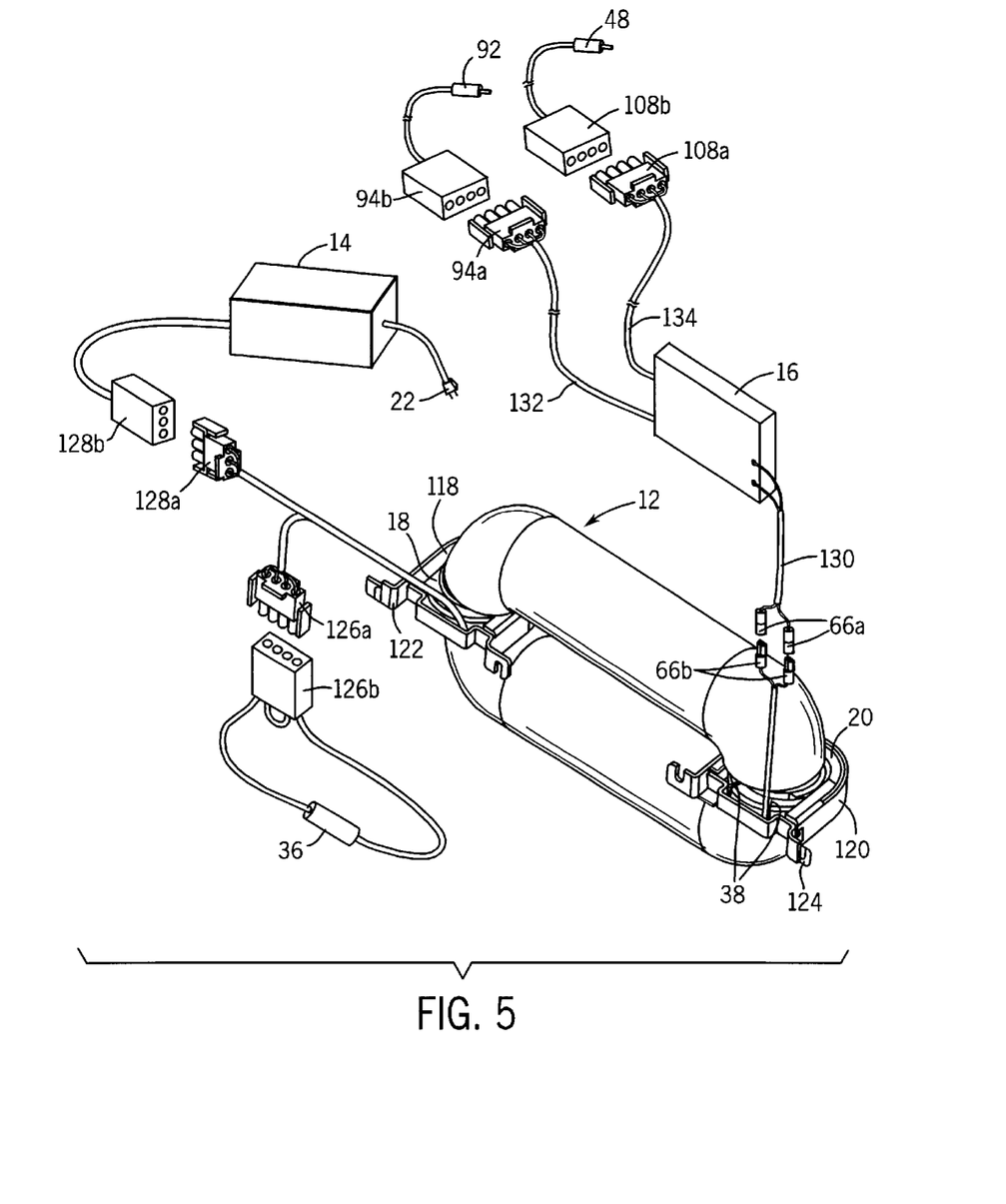
FIG. 5 illustrates the assembly of the dimmable light source of FIG. 2, showing the physical connections between the electrodeless lamp and coupling transformers, the dimming module and the ballast.

Turning now to FIG. 5, the assembly of the dimmable light source 10 is illustrated, including the electrodeless lamp 12, the coupling transformers 18 and 20, the auxiliary winding 38, the resistor 36, the dimming module 16, and the ballast 14. The cores of the coupling transformers 18 and 20 are separable into halves such that the transformers 18 and 20 can be removably secured to the lamp 12 by retaining spring clamps 118 and 120. The spring clamps 118 and 120 are further coupled to mounting brackets 122 and 124 for mounting the electrodeless lamp 12 in an appropriate housing.

A first end of the primary winding 30 (not shown in FIG. 5) of the coupling transformer 20 is connected in series with the resistor 36 via mating connectors 126*a* and 126*b*. The series combination of the resistor 36 and the primary winding 30 are connected in parallel with the primary winding 28 (not shown in FIG. 5) of the coupling transformer 18. The parallel connection points are connected to the ballast 14 via the mating connectors 128*a* and 128*b*. The secondary windings 32 and 34 of the coupling transformers 18 and 20 are the glass lamp vessel itself.

In one embodiment, the primary winding 30 of the coupling transformer 20 is wound within a 30° sector on the core 26. To maximize the coupling between the auxiliary winding 38 and the primary winding 30, the auxiliary winding is wound such that two turns are adjacent one end of the sector wound primary winding and the remaining two turns are adjacent the other end of the sector. The auxiliary winding can be wound onto the core of the transformer 20 simply by threading the wire through the core while the transformer 20 is positioned on the electrodeless lamp 12. Alternatively, the transformer 20 can be removed from the lamp 12 by removing the retaining spring clamp 120. The auxiliary winding 38 can then be appropriately wound onto the core and the core and spring clamp replaced on the lamp. Each end of the auxiliary winding 38 is connected to connection terminals 66*b*.

The connection terminals 66*b* mate with connection terminals 66*a* which are connected to the dimming module 16 via a wire harness 130. Wire harnesses 132 and 134 also are connected to the dimming module 16 and terminate in connectors 94*a* and 108*a*. The connectors 94*a* and 108*a* are coupled to the brightness adjustment potentiometer 92 via the connector 94*b* and the frequency adjustment potentiometer 48 via the connector 108*b*, respectively.

Figure 6:
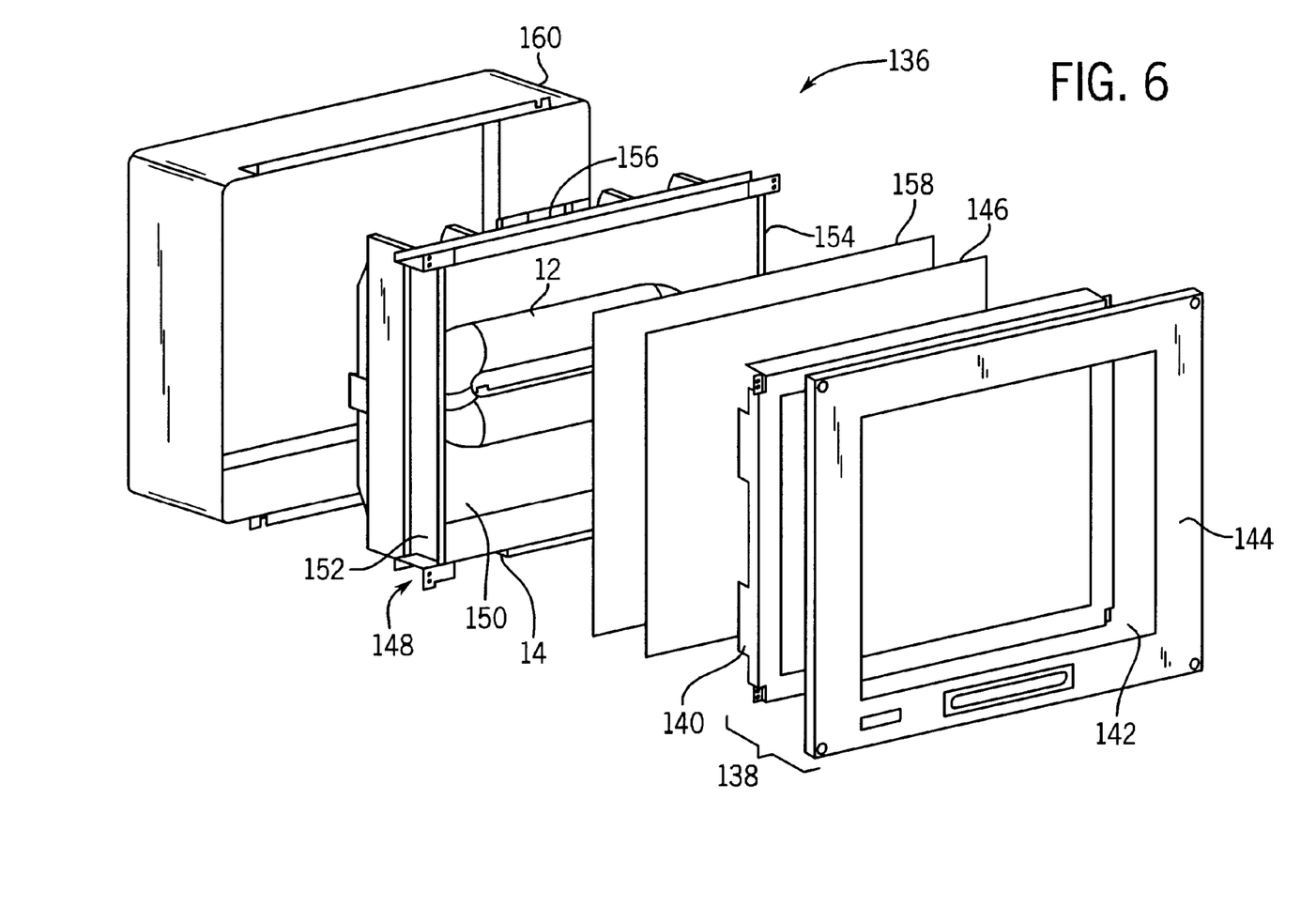
FIG. 6 illustrates the assembly of the dimmable light source of FIG. 5 in a video display device, the dimmable light source providing backlighting for the display device.

In an exemplary embodiment, the dimmable light source assembly 10 illustrated in FIG. 5 can be incorporated in a display device assembly, such as the display device assembly 136 illustrated in FIG. 6. The display device assembly 136 includes a display unit 138 having a conventional liquid crystal display (LCD) element 140 that responds to appropriate electrical input signals to display an image. In some embodiments, the electrical input signals may be received from the processing and control elements of a computer. The front of the LCD element 140 is typically protected by a transparent screen 142 made of glass, plastic, or other suitable material. The screen 142 is mounted within an opening on a front frame 144 of the display unit 138 such that a user may clearly view the image displayed by the LCD element 140.

The display device assembly 136 also includes a diffuser 146 disposed adjacent the LCD element 140. The diffuser 146 is arranged to receive light generated by the lamp 12 and to transmit the light to the LCD element 140 such that the LCD element 140 is substantially uniformly illuminated.

The lamp 12 is mounted in a lamp housing 148 via mounting brackets (not shown), such as the mounting brackets 122 and 124 illustrated in FIG. 5. The lamp housing 148 includes a back reflective surface 150 and two end plates 152 and 154 which may be coated with a reflective material, such as an aluminum or silver-based material, or which may be made of a reflective material to form a reflective lamp lining. The lamp housing 148 can be formed, or stamped, from a suitable material in any number of well-known manufacturing processes. The reflective lamp lining may be configured to reflect light generated by the lamp 12 in a uniform manner toward the diffuser 146 and the LCD element 140.

The ballast 14, the dimming module 16 (not shown in FIG. 6), and the resistor 36 (not shown in FIG. 6) can be mounted to the interior or exterior surfaces of the lamp housing 148 in an appropriate manner, such as by using mounting brackets, mounting bosses, etc. The wiring harnesses 132 and 134 connecting the brightness adjustment potentiometer 92 and the frequency adjustment device 48 to the dimming module 16 can be appropriately routed such that devices 92 and 48 can be mounted to, for example, the front frame 144 of the display unit 138, or in any other location that is accessible to the user. Further, in some embodiments the dimming module may be connected to video display electronics to receive, for example, a video refresh signal to synchronize the switching frequency. Alternatively, the dimming module may be configured to receive input signals from a processor or other control elements of a computing device with which the display device assembly 136 is used.

The display device assembly 136 further includes a fan 156 mounted to the lamp housing 148 to cool the assembly. To provide further cooling, a heat absorbing sheet of glass 158 can be disposed in front of the lamp 12. Because the lamp 12 provides a bright light, the glass 158 can be relatively inefficient at transmitting light. A back casing 160 attaches to the front frame 144 to enclose the various components.

The dimmable video display assembly illustrated in FIG. 6 is merely an exemplary application of the dimmable light source. Other applications for the dimmable light source can be readily envisioned, such as lighting systems or light fixtures for the home or office. Further, it is envisioned that the assembly may include other components and mounting arrangements depending on the application and the intended use of the display, as would be obvious to a person of ordinary skill in the art.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A dimmable light source, comprising:
an electrodeless lamp to generate light;
a ballast coupled to the electrodeless lamp to provide energy to energize the lamp;
a dimming circuit coupled to the electrodeless lamp to control the energy provided to the lamp to vary the brightness of the generated light;
a coupling transformer inductively coupled to the electrodeless lamp, wherein the ballast is coupled to the coupling transformer to provide the energy to energize the lamp; and
an auxiliary winding electromagnetically coupled to the coupling transformer to couple the dimming circuit to the electrodeless lamp.

2. The dimmable light source as recited in claim 1, wherein the dimming circuit comprises a switch coupled to the auxiliary winding and a drive circuit coupled to the switch, the drive circuit being configured to transition the switch between a conductive state and a non-conductive state during a time interval, wherein a current-carrying path is established through the auxiliary winding and the switch during the conductive state.

3. The dimmable light source as recited in claim 2, comprising an adjustment device to adjust a ratio of the conductive state to the non-conductive state during the time interval.

4. The dimmable light source as recited in claim 3, wherein the adjustment device is accessible to a user.

5. The dimmable light source as recited in claim 3, wherein the adjustment device comprises a photodetector and the dimming circuit adjusts the ratio in response to an amount of ambient light energy detected by the photodetector.

6. The dimmable light source as recited in claim 2, wherein the time interval has a repetition frequency and the dimming circuit adjusts the repetition frequency.

7. The dimmable light source as recited in claim 6, comprising a frequency adjustment device adapted to manually adjust the repetition frequency.

8. The dimmable light source as recited in claim 6, wherein the dimming circuit comprises a synchronization circuit to adjust the repetition frequency to be in synchronicity with a frequency of a synchronization signal applied to an input of the synchronization circuit.

9. A dimming circuit for an electrodeless lamp inductively coupled to a coupling transformer that provides electromagnetic energy to cause the lamp to generate light, the dimming circuit comprising:
an auxiliary winding adapted to be electromagnetically coupled to the coupling transformer;
a switch coupled to the auxiliary winding; and
a drive circuit coupled to the switch to transition the switch between a conductive state and a non-conductive state during a time interval to control brightness of the generated light, wherein a current-carrying path is established through the auxiliary winding and the switch during the conductive state.

10. The dimming circuit as recited in claim 9, further comprises a frequency adjustment device, wherein the time interval has a repetition frequency and the frequency adjustment device adjusts the repetition frequency.

11. The dimming circuit as recited in claim 10, wherein the frequency adjustment device comprises a synchronization circuit coupled to the drive circuit to synchronize the repetition frequency with a frequency of a synchronization signal applied to the synchronization circuit.

12. The dimming circuit as recited in claim 9, wherein a ratio of the conductive state to the non-conductive state during the time interval is adjustable to control the brightness of the generated light variably.

13. The dimming circuit as recited in claim 9, wherein the ratio is continuously adjustable within a range.

14. The dimming circuit as recited in claim 12, comprising an adjustment device to manually adjust the ratio.

15. The dimming circuit as recited in claim 14, wherein the adjustment device has a plurality of discrete settings, each discrete setting corresponding to a discrete degree of brightness of the generated light.

16. A dimmable display device, comprising:
an electrodeless lamp to generate light;
a display unit to display an image, the lamp being operably positioned with respect to the display unit to illuminate the display unit to enhance viewing of the image;
a dimming module coupled to the electrodeless fluorescent lamp to control brightness of the generated light in response to a control signal; and
a coupling transformer coupled to the electrodeless lamp, the coupling transformer providing electromagnetic energy to energize the lamp to generate the light,
wherein the dimming module comprises an auxiliary winding electromagnetically coupled to the coupling transformer, a switch coupled to the auxiliary winding, and a drive circuit to transition the switch between a conductive state and a non-conductive state during a time interval, wherein a current-carving path is established through the auxiliary winding and the switch during the conductive state.

17. The dimmable display device as recited in claim 16, wherein the dimming module comprises a photodetector to detect ambient light and the control signal is representative of the detected ambient light.

18. The dimmable display device as recited in claim 16, wherein the dimming module comprises a dimming control device having a range of manually selectable dimming settings and the control signal is based on the selected dimming setting.

19. The dimmable display device as recited in claim 16, wherein the dimming module is electromagnetically coupled to the electrodeless lamp to control the brightness of the generated light.

20. The dimmable display device as recited in claim 16, wherein a ratio between the conductive state and the non-conductive state during the time interval is adjustable.

21. The dimmable display device as recited in claim 20, wherein the drive circuit comprises a pulse-width modulator to adjust the ratio.

22. The dimmable display device as recited in claim 16, wherein the time interval has a repetition frequency and the repetition frequency is adjustable.

23. The dimmable display device as recited in claim 22, wherein the repetition frequency is manually adjustable.

24. The dimmable display device as recited in claim 22, wherein the display unit is configured to refresh the image at a refresh frequency and the repetition frequency is adjustable for synchronization with the refresh frequency.

25. A method for dimming an electrodeless lamp, comprising:

inductively coupling energy to an electrodeless lamp to energize the electrodeless lamp and generate light; and restricting the coupling of the energy during a dimming portion of a time period to dim the generated light, the time period having a frequency of occurrence.

26. The method as recited in claim 25, comprising:

adjusting a length of the dimming portion of the time period to dim the generated light over a dimming range.

27. The method as recited in claim 26, comprising:

discretely adjusting the length of the dimming portion of the time period to dim the generated light in discrete steps within the dimming range.

28. The method as recited in claim 26, comprising:

adjusting the frequency of occurrence of the time period.

29. The method as recited in claim 26, comprising:

providing a synchronization signal having a synchronization frequency; and synchronizing the frequency of occurrence of the time period to the synchronization frequency.

30. A method for making a dimmable electrodeless light source, comprising:

providing an electrodeless lamp having a coupling transformer;

disposing an auxiliary winding on the coupling transformer; and coupling the auxiliary winding to a drive circuit, the drive circuit being configured to establish a current carrying path through the auxiliary winding for a first time interval of a time period and to interrupt the current carrying path through the auxiliary winding for a second time interval of the time period to control brightness of light generated by the lamp.

31. The method as recited in claim 30, comprising:

connecting a dimming control device to the drive circuit, the dimming control device being accessible to a user of the dimmable electrodeless light source to control length of the first time interval of the time period.

32. A dimmable display device, comprising:

an electrodeless lamp to generate light;

a display unit to display an image, the lamp being operably positioned with respect to the display unit to illuminate the display unit to enhance viewing of the image; and a dimming module coupled to the electrodeless fluorescent lamp to control brightness of the generated light in response to a control signal, wherein the dimming module comprises a photodetector to detect ambient light and the control signal is representative of the detected ambient light.

33. A dimmable display device, comprising:

an electrodeless lamp to generate light;

a display unit to display an image, the lamp being operably positioned with respect to the display unit to illuminate the display unit to enhance viewing of the image; and a dimming module coupled to the electrodeless fluorescent lamp to control brightness of the generated light in response to a control signal, wherein the dimming module comprises a dimming control device having a range of manually selectable dimming settings and the control signal is based on the selected dimming setting.

* * * * *